(No Model.)
S. H. SHORT.
ELECTRIC RAILWAY MOTOR.
No. 475,160. Patented May 17, 1892.
3 Sheets—Sheet 2.
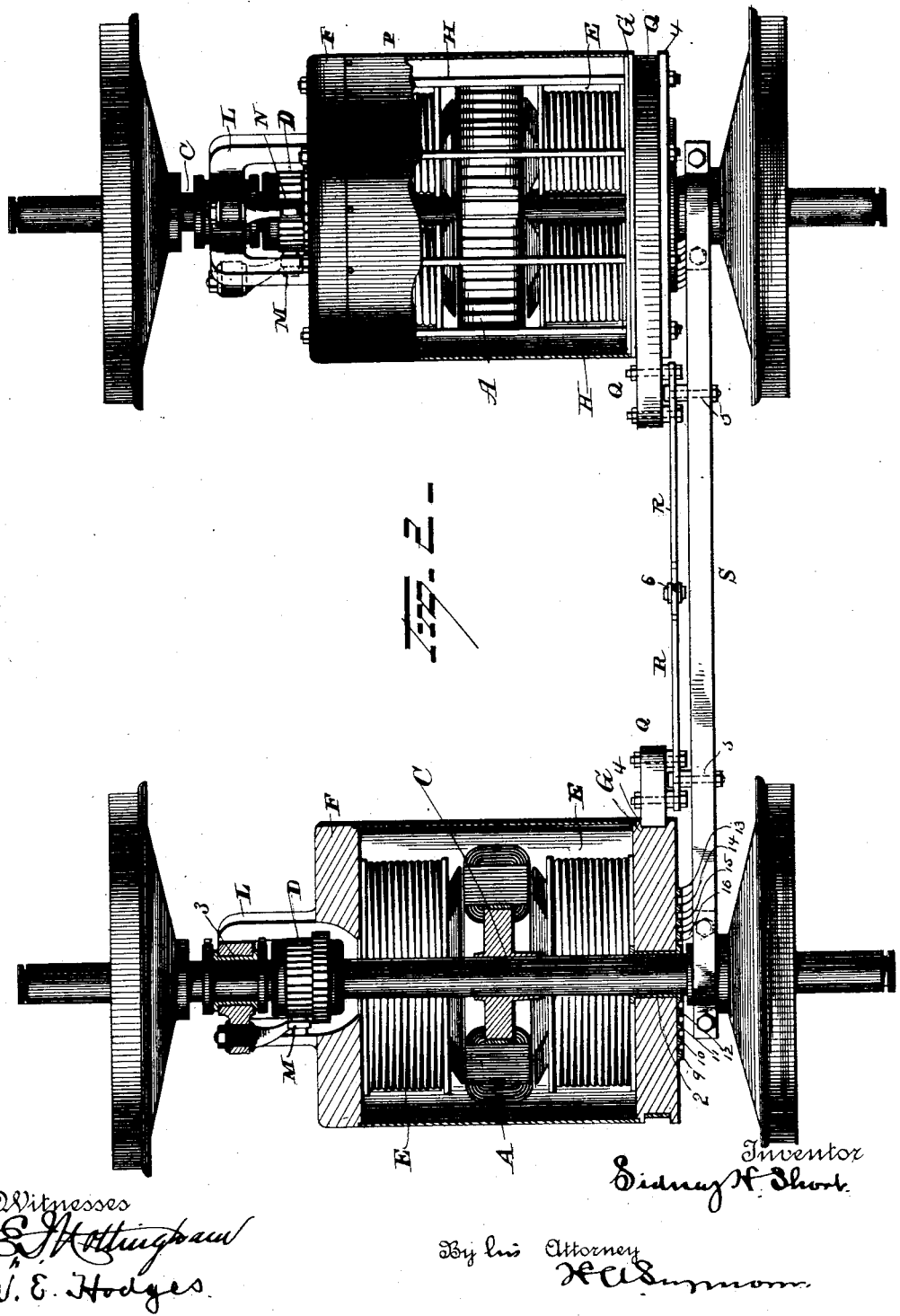

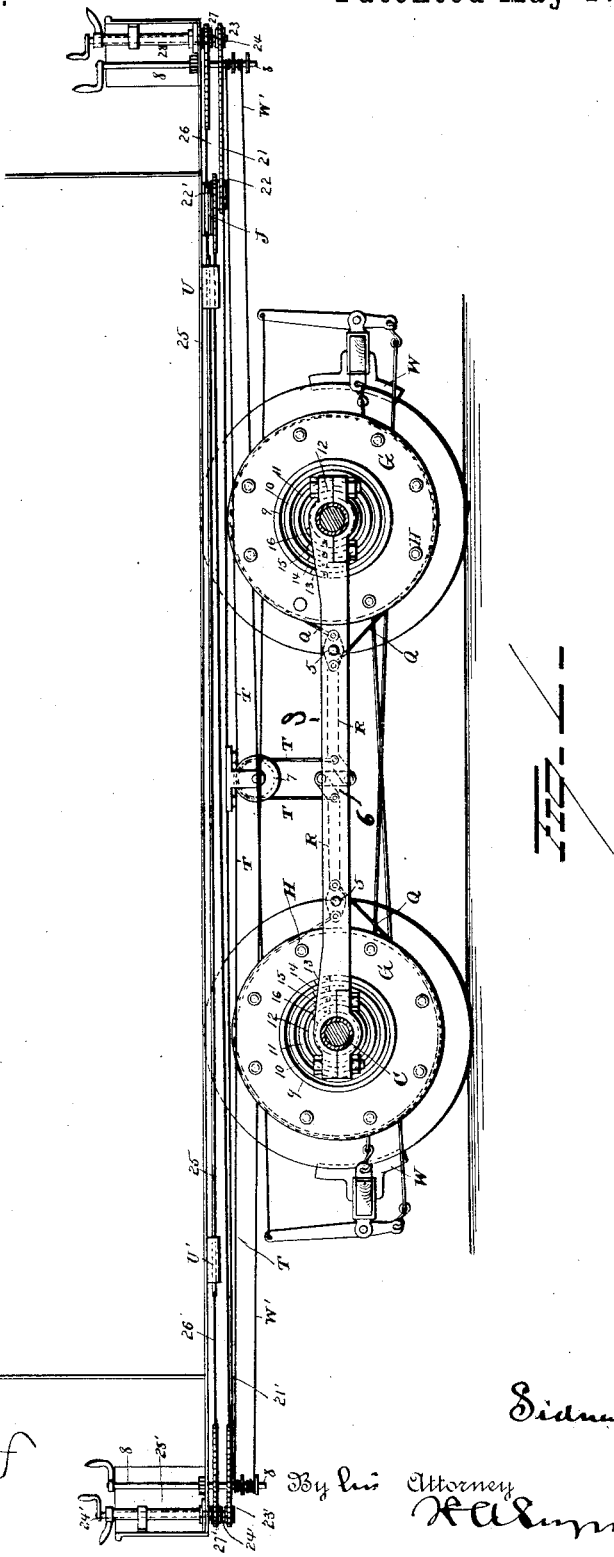

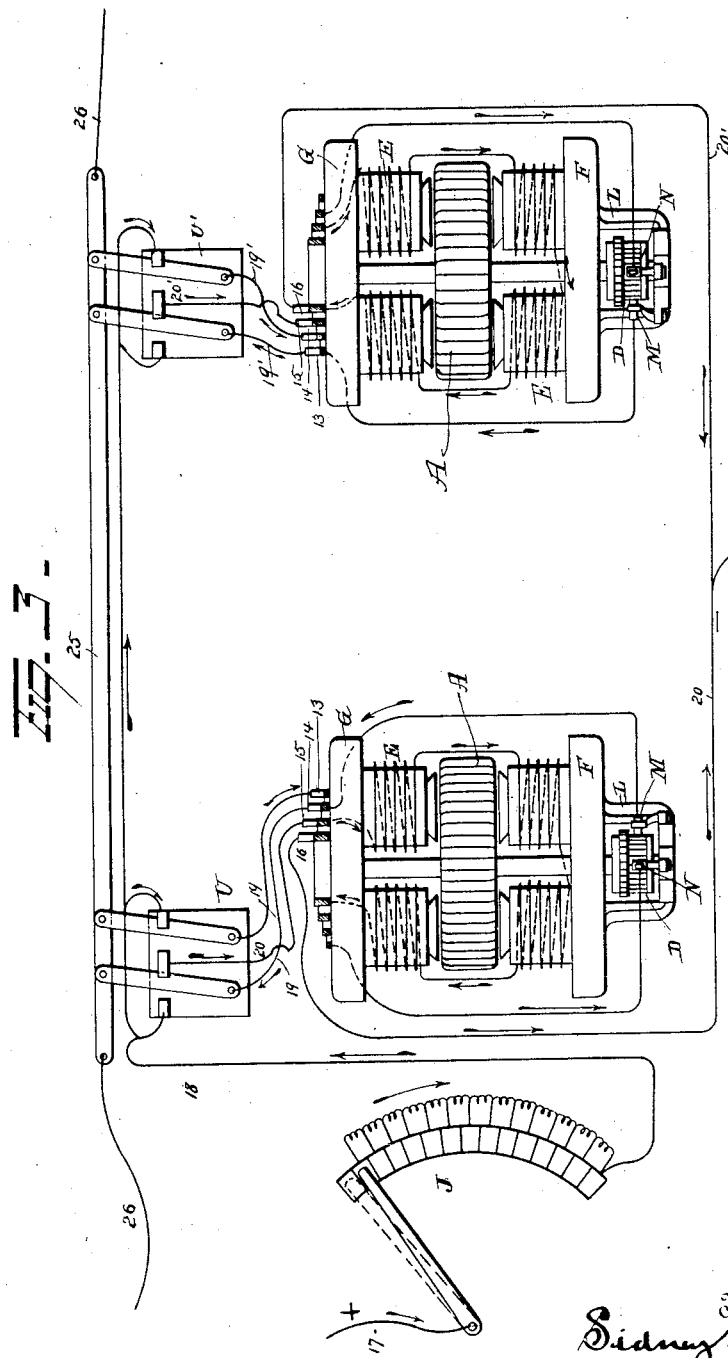

UNITED STATES PATENT OFFICE.

SIDNEY H. SHORT, OF CLEVELAND, OHIO, ASSIGNOR TO THE SHORT ELECTRIC RAILWAY COMPANY, OF SAME PLACE.

ELECTRIC-RAILWAY MOTOR.

SPECIFICATION forming part of Letters Patent No. 475,160, dated May 17, 1892.

Application filed December 4, 1890. Serial No. 373,540. (No model.)

*To all whom it may concern:*

Be it known that I, SIDNEY H. SHORT, of Cleveland, in the county of Cuyahoga and State of Ohio, have invented certain new and useful Improvements in Electric Motors for Railway and other Purposes; and I do hereby declare the following to be a full, clear, and exact description of the invention, such as will enable others skilled in the art to which it appertains to make and use the same.

This invention relates more particularly to propelling machinery of electric cars, in which the armature of a propelling-motor is axially placed with reference to the driving-axle and is directly connected with such axle. By "axially placed" is to be understood that the axes of the armature and the driving-axle are coincident or nearly so. By "directly connected" is to be understood that the driving connection is such as to rotate the driving-axle once for each rotation of the propelling-armature, the simplest form of such connection being a mounting of the armature fast on the driving-axle, as by means of a key. The invention, however, has reference also to geared motors with the armatures axially placed or otherwise and to directly-connected motors with the armatures not placed axially, and some at least of the improvements are applicable to electric motors irrespective of motor-cars. In general it may be said that each of the improvements that constitute the invention is included for all the uses to which it may be applicable.

In accordance with the present invention the field-magnets of the motor, as well as the armature, are so mounted as to be capable of rotation, but are held from rotation when it is desired to have the motor exert its power, a clutch or brake or removable stop of any known or suitable description being employed to arrest the motion of the field-magnets or to allow their rotation at will. This device or holdback (which for convenience is hereinafter designated as a "retaining-clutch") may be adapted so to hold the field-magnets as to moderate their movements. With this arrangement so long as the field-magnets are held stationary the motor operates as a motor with non-rotative field-magnets; but if it is desired to stop the propulsion it is not necessary to interrupt the current, for by releasing the field-magnets these commence to rotate backward and there is little or nothing for the armature to react upon, so that its forward motion is soon arrested by the resistance to be overcome. To bring it more speedily to a stop a brake may be applied. The backward rotation of the field-magnets tends of course to set up a counter electro-motive force, and if said magnets are permitted to rotate freely this counter force cuts down the current to small proportions. To assist this action an adjustable rheostat may be placed in the circuit, and the clutch may be adapted to moderate the rotation of the field-magnets to prevent their attaining a dangerous speed, or a separate check may be used for this purpose. In restarting the motor the field-magnets are checked and the current increases until the armature commences to rotate. The current can at the same time be further increased by cutting out resistance at the rheostat. It will be observed that in starting with the field-magnets rotating backward the armature is already magnetized and a counter electro-motive force developed, so that the liability of burning out the motor is diminished, for the counter electro-motive force never diminishes below the point at which the current becomes sufficient to start the car. It will also be observed that the power is applied gradually to turn the armature.

The invention extends generally to a motor such as above indicated, irrespective of the particular type. Nevertheless it is preferred to employ that type of motor which has field-magnets projecting from yokes at the sides of the armature, for one reason because they are thus nearer to the axis of rotation and generate therefore less centrifugal force in rotation.

In order to employ the new and improved motor for propelling railway-cars, the armature may be connected with a driving-axle in any known or suitable way. The clutch may be mounted on the motor-frame where this does not rotate or on a separate frame. Preferably the armature is mounted on the driving-axle and connected directly therewith, and the field-magnets are supported by journals on the same axle, the clutch mechanism being carried by a part of the car, whereby its tendency to turn with the field-magnets when applied thereto is resisted. A motor may be connected with each car-axle and the clutches be connected with each other or with operating mechanism common to both, so that they can be applied or released together. Operating mechanism is or may be provided at each end of the car for the clutches and the rheostat and other motor-controlling appliances. The ordinary car-brakes are or may be used to arrest the motion of the armature, which is connected with the car-wheels directly or indirectly by suitable driving means.

In the accompanying drawings, which form part of this specification, Figure I is a side view, in partial sectional elevation, of an electric car provided with propelling machinery constructed in accordance with the present invention. Fig. II is a plan, partly in horizontal section, of part of the car-truck and the same propelling machinery; and Fig. III is a diagram illustrating the electical connections.

A motor is shown for each car-axle. The armature A of each motor is axially placed with reference to the car-axle C and is directly connected therewith, being mounted fast on the same. The commutator D is also fast on the car-axle C. The field-magnets E project from yokes F and G, which are tied together by cross-bars H and are supported on journal-bearings, one bearing being as shown in the yoke G at 2 and the other bearing in the bracket L on the yoke F at 3. The commutator-brushes M and N are carried by the bracket L. As shown, the eight magnets E make a field with four poles and the commutator-brushes are placed ninety degrees apart, cross-connections being employed at the commutator, as well understood. Instead of this four-pole motor other suitable motor, as one with more poles or one with two poles only, could be used. The motor is shown as inclosed in a box formed by the yokes F and G and cylindrical cover P of, say, sheet-iron. If now the field-magnets be held from rotation, it is evident that the armature A, under the action of the electric current, will rotate and turn the axle C with it, so as to propel the car. On the other hand, if the field-magnets be not held from rotation, then on the passage of the current the reaction will rotate said magnets backward.

In order to hold the field-magnets E from rotating or to permit their rotation at will, a clutch is provided, which, as shown, is in the form of a strap-brake Q, which engages the yoke G, the latter having a cylindrical periphery with a groove 4 therein for receiving the strap. The said yoke therefore constitutes or forms part of a brake-drum. The brake-strap Q is attached to a lever R, which is fulcrumed at 5 on the bar S, connecting the car-axles C. The bar S has journal-bearings at the end. The clutch-brake Q could of course be connected with any suitable part of the car and may be operated through any convenient means. As shown, the two levers R are connected with each other by a link 6, and a chain T runs from each lever around a pulley 7 to one end of the car, and is mounted on a vertical shaft 8 after the fashion of the ordinary car-brake chain.

On the yoke G are insulated conducting-rings 9, 10, 11, and 12, which constitute the terminals of the field and armature coils, respectively. Brushes 13, 14, 15, and 16, fastened to the bar S, bear on these rings and supply the current to the motor.

The electrical connections are as follows, (see Fig. III:) The supply-wire 17, leading from a trolley or a battery on the car, for example, is connected with the switch-arm of the rheostat J. From the rheostat the wire 18 is connected by branches with the outside contacts of the reversing-switches U U', one for each motor. The brushes 13 and 14 for the armature-coils of each motor are included in the loop 19 or 19' between the levers of the reversing-switch U or U'. A branch 20 or 20' leads by way of the brushes 15 and 16 from the center contact of each reversing-switch through the field-coils of each motor to the ground or to the return wire. The brake-shoes for the car-wheels are shown at W and the chains for operating them at W', said chain being wrapped around the vertical shaft 8 in the opposite direction to the chains T, so that when one is wound the other is unwound. There should be sufficient length of chain to allow both brakes to be off at the same time. A wheel and dog adapted to hold the shaft 8 from turning in either direction when said dogs are properly engaged are employed.

The connections for conveying the power from the brake-chains to the brake-shoes need not be described. Many arrangements of mechanism are known for this purpose, and such mechanism may be of any ordinary or suitable description so far as the present invention is concerned. The rheostat J is shown as adapted to be operated from either end of the car by a chain 21 or 21' and sprocket-wheels 22 23 or 22' 23', the wheels 23 23' being fast at each on a shaft 24 or 24', which has an operating crank-handle, and the wheels 22 22' being connected with the rheostatic switch-arm. The reversing-switches U U' are connected with each other by a bar 25, whose ends are connected with each other by a chain 26, which runs around sprocket-wheels 27 27', fast on hollow shafts 28 28', surrounding the shafts 24 24' at opposite ends of the car and provided with operating crank-handles. Of course other suitable means for operating the rheostat and reversing switches could be used.

When the motor-man wishes to start a car with the current cut-off, (the circuit being broken, for example, at the rheostat J by the switch-arm resting upon an insulated contact, as indicated in dotted lines in Fig. III,) he may release the car-brakes W and apply the retaining clutch-brake Q before turning the rheostat to supply the current, or he may turn the rheostat before applying the clutch-brake Q. In the former case the car starts the same as if the field-magnets were permanently non-rotative. In the latter case the current first acts to start the field-magnets backward. On the application of the retaining-clutch Q (the car-brakes W being released) the rotation of the field-magnets is gradually checked and the pull on the armature increases until the car starts.

During the application of the retaining clutch or brake Q the rheostatic switch-lever may be turned to decrease the resistance in the circuit. In starting according to the latter method, therefore, it will be perceived that the counter electro-motive force is developed as soon as the current is put on before the car begins to start, and the starting takes place as soon as the already-magnetized motor has through the gradual increase of current sufficient torque to start the car.

In stopping the car the motor-man may leave the clutch-brake Q on and bring the car to rest by working the rheostat and car-brakes in the ordinary way, or he may release the clutch-brake with or without, at the same time applying the car-brake and cutting down the current at the rheostat. He may then, if he has not already done so, apply the car-brakes. In proceeding by this latter method it is not necessary to interrupt the circuit, as the backward rotation of the field-magnets will generate counter electro-motive force to reduce the current to a minimum. To start, it will only be necessary to apply the clutch-brake Q, release the car-brakes W, and turn on more current at the rheostat, if it has been reduced in stopping. To allow the car to coast or to run by its own momentum, it is only necessary to release the clutch-brake Q with or without reducing the current at the rheostat to prevent the field-magnets attaining an excessive speed.

In the preceding description the armature is mounted fast on the car-axle and the field-magnets are allowed to rotate thereon. It is evident that the arrangement could be reversed, the field-magnets being fast on the car-axle and the armature being allowed to rotate or be held from rotation by a suitable clutch or brake. This reverse arrangement, it will be understood, is included in the invention as a substitute for that already described without further specification herein. It is also evident that the field-magnets and armature could be connected with a shaft journaled in bearings the same as explained above for the car-axle, and that such shaft might be connected by any suitable mechanical means with the object, apparatus, or appliances to be moved or propelled.

Having fully described my invention, what I claim as new, and desire to secure by Letters Patent, is—

1. In an electric-motor car, the combination, with two electric motors having rotatable armatures and field-magnets, of two clutches, one for each field-magnet, for impeding and arresting the rotation of the latter and mechanism for operating both clutches simultaneously, substantially as described.

2. In an electric-motor car, the combination of an electric motor having its armature directly connected with a car-axle and rotatable field-magnets projecting from two connected circular yokes, with a clutch-band encircling one of the yokes and mechanism for operating the clutch, substantially as described.

3. In an electric-motor car, the combination, with two electric motors, each having its armature directly connected with a car-axle, and rotatable field-magnets, of two clutches, one for each field-magnet, brakes for the car-wheels, and a single mechanism for applying the clutches and releasing the brakes or releasing the clutches on applying the brakes simultaneously, substantially as described.

4. In an electric-motor car, the combination of an electric motor having its armature directly connected with a car-axle, rotatable field-magnets projecting from two connected circular yokes, and a clutch-band encircling one of the yokes, with brakes for the car-wheels, and a single mechanism for operating the clutch and brakes simultaneously, substantially as described.

5. In an electric-motor car, the combination, with two electric motors having rotatable armatures and rotatable field-magnets projecting from circular yokes, of two clutch-bands, each encircling one of the yokes, and a single mechanism for operating the two clutches simultaneously, substantially as described.

6. The combination, with an electric motor, of an inclosing shell or cover the ends of which are formed by the field-magnet yokes, substantially as described.

7. The combination of an electric motor having rotatable field-magnets projecting from connected yokes with an enveloping shell or cover secured to and revolving with the yokes, substantially as described.

8. The combination, with a car-axle, an armature arranged to rotate therewith, and field-magnets mounted to revolve on the axle in a direction reverse to that of the armature, said field-magnets being provided with end yokes and an inclosing covering, of a clutch constructed to engage one of the yokes of the field-magnets and impede and arrest the rotation of the latter, substantially as set forth.

In testimony whereof I have signed this specification in the presence of two subscribing witnesses.

S. H. SHORT.

Witnesses:
A. B. CALHOUN,
GEO. J. VAUGHAN.